(12) United States Patent
Park

(10) Patent No.: US 12,365,349 B2
(45) Date of Patent: Jul. 22, 2025

(54) DRIFT CONTROL APPARATUS AND METHOD OF CONTROLLING SAME

(71) Applicants: Hyundai Motor Company, Seoul (KR); Kia Corporation, Seoul (KR)

(72) Inventor: Jae Il Park, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 204 days.

(21) Appl. No.: 18/195,215

(22) Filed: May 9, 2023

(65) Prior Publication Data

US 2024/0166216 A1    May 23, 2024

(30) Foreign Application Priority Data

Nov. 23, 2022   (KR) .......................... 10-2022-0158582

(51) Int. Cl.
   *B60W 40/13*    (2012.01)
   *B60W 50/10*    (2012.01)

(52) U.S. Cl.
   CPC ............ *B60W 40/13* (2013.01); *B60W 50/10* (2013.01); *B60W 2520/105* (2013.01); *B60W 2520/125* (2013.01); *B60W 2520/14* (2013.01)

(58) Field of Classification Search
   CPC .................. B60W 40/13; B60W 50/10; B60W 2520/105; B60W 2520/125; B60W 2520/14
   See application file for complete search history.

(56) References Cited

U.S. PATENT DOCUMENTS

| 6,374,162 B1 * | 4/2002 | Tanaka .................. B60T 8/1755 701/72 |
| 2002/0109402 A1 | 8/2002 | Nakamura |
| 2012/0179349 A1 * | 7/2012 | Yamakado .......... B60W 30/045 701/89 |
| 2013/0144476 A1 * | 6/2013 | Pinto ....................... B60L 50/00 903/930 |
| 2023/0029148 A1 * | 1/2023 | Gully .................. B60R 16/0231 |

FOREIGN PATENT DOCUMENTS

| JP | H10-6804 A | 1/1998 |
| JP | H11-48735 A | 2/1999 |
| JP | H11-91526 A | 4/1999 |
| JP | H11-180329 A | 7/1999 |
| KR | 10-2013-0124051 A | 11/2013 |
| KR | 10-2022-0026655 A | 3/2022 |

* cited by examiner

*Primary Examiner* — Wade Miles
*Assistant Examiner* — Jerrod Irvin Davis
(74) *Attorney, Agent, or Firm* — Morgan, Lewis & Bockius LLP

(57) ABSTRACT

A drift control apparatus and method of controlling the same, include a sensor, a processor and a driving device. The sensor may obtain driving state information of a vehicle. The processor is configured to determine a drift state of the vehicle according to the driving state information, generate a control signal corresponding to detecting the drift state, determine a vertical load deviation between an internal wheel and an external wheel of the vehicle in the drift state, and determine a control amount in proportion to the vertical load deviation. The driving device may control driving forces of wheels based on the control amount in response to the control signal.

18 Claims, 12 Drawing Sheets

DRIFT CONTROL APPARATUS AND METHOD OF CONTROLLING SAME

CROSS-REFERENCE TO RELATED APPLICATION

The present application claims priority to Korean Patent Application No. 10-2022-0158582, filed on Nov. 23, 2022, the entire contents of which is incorporated herein for all purposes by this reference.

BACKGROUND OF THE PRESENT DISCLOSURE

Field of the Present Disclosure

The present disclosure relates to a drift control apparatus and method of controlling the same, and more particularly, to a technique for adjusting driving force of wheels in a drift state of a vehicle.

Description of Related Art

Recently, as the number of drivers who desire to feel the joy of driving increases, the demand for high-performance vehicles is also increasing, and the number of drivers driving circuits is also increasing. Representatively, drivers who intentionally cause an oversteer phenomenon that occurs in a situation that requires limit handling beyond a general driving range, such as when driving on a circuit, and enjoy a drift that drives a vehicle in the oversteer phenomenon have increased.

In a drift state, the possibility of a safety accident may be high because it is difficult to operate driving.

Furthermore, in a specific driving mode, a chattering phenomenon of a driving motor may occur in a drift state, so that the driver may feel uncomfortable handling.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a drift control apparatus and a method of controlling the same capable of improving drift performance and making driving easier.

Furthermore, another aspect of the present disclosure provides a drift control apparatus and a method of controlling the same capable of improving the occurrence of a chattering phenomenon of a driving motor.

Furthermore, yet another aspect of the present disclosure provides a drift control apparatus and a method of controlling the same capable of improving an uncomfortable feeling of operation that a driver may feel and improving a sense of heterogeneity in a driving operation in a drift end state.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a drift control apparatus includes a sensor, a processor and a driving device. The sensor may obtain driving state information of a vehicle. The processor is configured to determine a drift state of the vehicle according to the driving state information, generate a control signal corresponding to detecting the drift state, determine a vertical load deviation between an internal wheel and an external wheel of the vehicle in the drift state, and determine a control amount in proportion to the vertical load deviation. The driving device may control driving forces of wheels based on the control amount in response to the control signal.

According to an exemplary embodiment of the present disclosure, the processor is configured to generate the control signal at a timing that satisfies a first condition in which directions of a steering angle and a yaw rate of the vehicle are opposite to each other from a same state.

According to an exemplary embodiment of the present disclosure, the processor is configured to generate the control signal when the yaw rate is equal to or greater than a first threshold value and a lateral slip angle is equal to or greater than a second threshold value.

According to an exemplary embodiment of the present disclosure, the processor is configured to generate the control signal when an accelerator pedal signal is equal to or greater than a third threshold value and a brake pedal signal is equal to or less than a fourth threshold value.

According to an exemplary embodiment of the present disclosure, the processor is configured to stop an output of the control signal when the processor concludes that at least one of the first condition, the second condition, and the third condition is not satisfied.

According to an exemplary embodiment of the present disclosure, the processor is configured to determine a vertical load of each of at least one pair of internal and external wheels in the vehicle based on a longitudinal acceleration and a lateral acceleration.

According to an exemplary embodiment of the present disclosure, the processor is configured to determine a vertical load deviation between an internal wheel of a driving wheel and an external wheel of the driving wheel.

According to an exemplary embodiment of the present disclosure, the processor is configured to determine the control amount to be larger in proportion to a mass and a speed of the vehicle.

According to an exemplary embodiment of the present disclosure, the processor is configured to transmit a driving force proportional to the control amount to external wheels in a turning direction of the vehicle in the drift state.

According to an exemplary embodiment of the present disclosure, the processor is configured to control driving forces of the wheels to reduce a wheel speed difference between the internal wheel and the external wheel in a non-drift state.

According to another aspect of the present disclosure, a method of controlling drift includes determining a drift state of a vehicle based on the driving state information of the vehicle and generating a control signal corresponding to detecting the drift state, determining a vertical load deviation between an internal wheel and an external wheel of the vehicle in response to the control signal, determining a control amount in proportion to the vertical load deviation, and controlling a driving force of the vehicle based on the control amount.

According to an exemplary embodiment of the present disclosure, the generating of the control signal may include generating the control signal at a timing that satisfies a first condition in which directions of a steering angle and a yaw rate of the vehicle are opposite to each other from a same state.

According to an exemplary embodiment of the present disclosure, the generating of the control signal may further include determining whether the yaw rate is equal to or greater than a first threshold value and a lateral slip angle is equal to or greater than a second threshold value.

According to an exemplary embodiment of the present disclosure, the generating of the control signal may further include determining whether an accelerator pedal signal is equal to or greater than a third threshold value and a brake pedal signal is equal to or less than a fourth threshold value.

According to an exemplary embodiment of the present disclosure, the generating of the control signal may further include stopping an output of the control signal when at least one of the first condition, the second condition, and the third condition is not satisfied.

According to an exemplary embodiment of the present disclosure, the determining of the vertical load deviation may include determining a vertical load of each of at least one pair of internal and external wheels in the vehicle based on a longitudinal acceleration and a lateral acceleration.

According to an exemplary embodiment of the present disclosure, the determining of the vertical load deviation may include determining a vertical load deviation between an internal wheel of a driving wheel and an external wheel of the driving wheel.

According to an exemplary embodiment of the present disclosure, the determining of the control amount may include determining the control amount to be larger in proportion to a mass and a speed of the vehicle.

According to an exemplary embodiment of the present disclosure, the controlling of the driving forces may include transmitting a driving force proportional to the control amount to external wheels in a turning direction of the vehicle in the drift state.

According to an exemplary embodiment of the present disclosure, the controlling of the driving forces may include controlling driving forces of the wheels to reduce a wheel speed difference between the internal wheel and the external wheel in a non-drift state.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
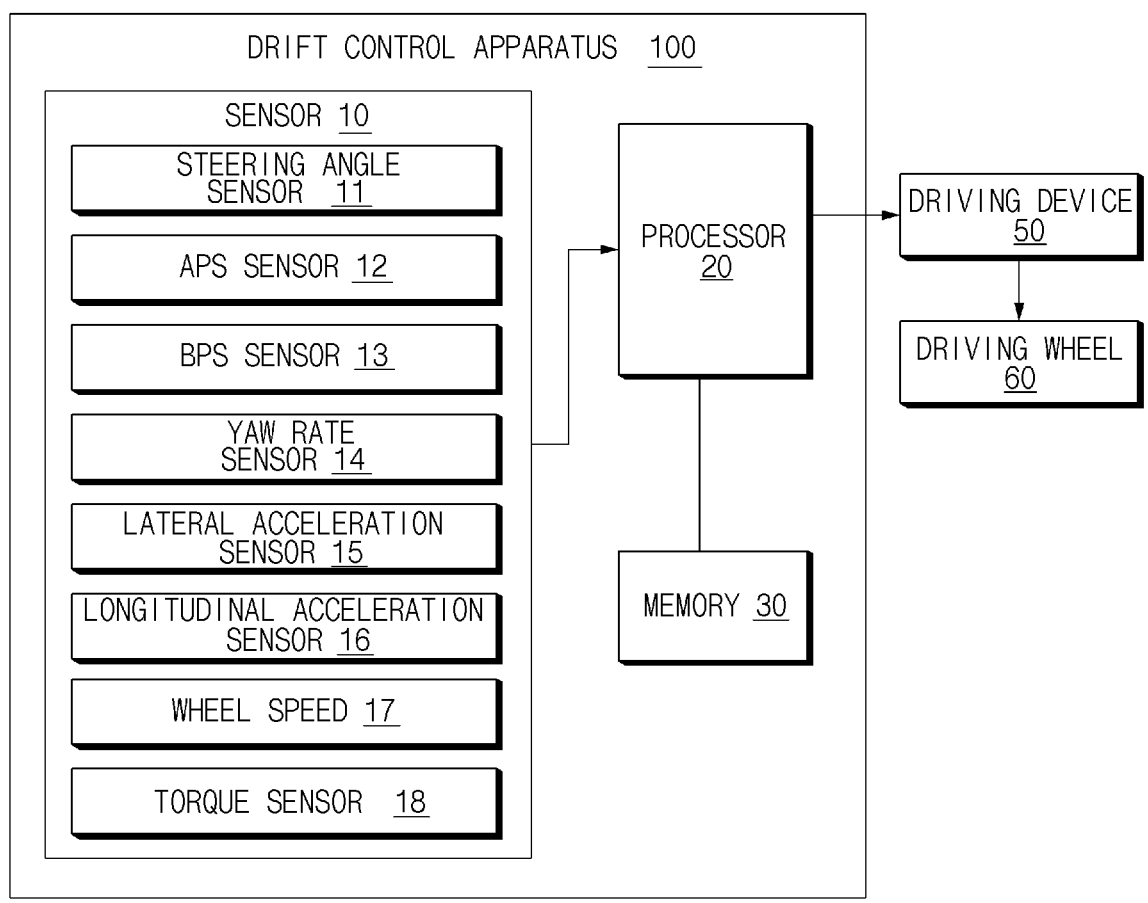
FIG. 1 is a block diagram illustrating the configuration of a drift control apparatus according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present disclosure, a detailed description of the related known configuration or function will be omitted when it is determined that it interferes with the understanding of the exemplary embodiment of the present disclosure.

In describing the components of the exemplary embodiment of the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which the present disclosure belongs. It will be further understood that terms, such as those defined in commonly used dictionaries, should be interpreted as having a meaning which is consistent with their meaning in the context of the relevant art and will not be interpreted in an idealized or overly formal sense unless expressly so defined herein.

Hereinafter, with reference to FIG. 1, FIG. 2, FIG. 3, FIG. 4, FIG. 5, FIG. 6, FIG. 7, FIG. 8, FIG. 9, FIG. 10, FIG. 11 and FIG. 12, various embodiments of the present disclosure will be described in detail.

FIG. 1 is a block diagram illustrating the configuration of a drift control apparatus according to an exemplary embodiment of the present disclosure. A drift control apparatus shown in FIG. 1 may be implemented inside a vehicle. A drift control apparatus 100 may be integrally formed with the internal control units of a vehicle, or may be implemented as a separate device and connected to the control units of a vehicle by a separate connection part.

Referring to FIG. 1, the drift control apparatus 100 according to an exemplary embodiment of the present disclosure may include a sensor 10, a processor 20, and a memory 30. The drift control apparatus 100 according to an exemplary embodiment of the present disclosure, which is configured to control a driving device 50 that operates driving wheels 60, may control the driving device 50 in a drift state. The driving device 50, which provides a driving force to the driving wheels 60, may be a driving motor of an electric vehicle.

The sensor 10 is configured to determine a driving state of a vehicle controlled by a driving control device. The driving control device, which receives a user input for driving, may include a steering input device such as a steering wheel, an accelerator pedal, a brake pedal, and the like.

The sensor 10 may include a steering angle sensor 11, an accelerator pedal position sensor (hereinafter, referred to as APS) 12, a brake pedal position sensor (hereinafter, referred to as BPS) 13, a yaw rate sensor 14, a lateral acceleration sensor 15, a longitudinal acceleration sensor 16, a wheel speed sensor 17, and a torque sensor 18.

The steering angle sensor 11, which detects the angular velocity of a steering wheel, may detect the steering speed, steering direction, and steering angle of the steering wheel. The steering angle sensor 11 may include a plurality of optical elements and a plate located inside the steering wheel, and may detect the steering angle of the steering wheel based on a voltage variation caused by passing or blocking light of the optical elements according to the rotation of the steering wheel.

The APS 12 may include a switch which is turned on when the movement of an accelerator pedal is detected and a resistance sensor whose resistance value is changed in conjunction with the movement of the accelerator pedal.

The BPS 13 may include a switch which is turned on when the movement of a brake pedal is detected, and a resistance sensor whose resistance value is changed in conjunction with the movement of the brake pedal.

The yaw rate sensor 14, which detects a degree of rotation of the vehicle in a z-axis direction, may detect a yaw moment of the vehicle based on a plate fork inside the yaw rate sensor 14 causing vibration change.

The lateral acceleration sensor 15, which detects a lateral acceleration of the vehicle, may be implemented integrally with the yaw rate sensor 14.

The longitudinal acceleration sensor 16, which detects a longitudinal acceleration of the vehicle, may be mounted on a specified area of a wheel.

The wheel speed sensor 17 may be attached to a wheel to detect the rotation speed, and obtain the vehicle speed based on the rotation speed of the wheel.

The torque sensor 18 may detect a torque value of the driving device 50. When the exemplary embodiment of the present disclosure is applied to an electric vehicle, the driving device 50 may be a driving motor.

The processor 20 may be configured to determine drift based on vehicle state information obtained by the sensor 10. Furthermore, the processor 20 may be configured to determine a vertical load deviation based on the result of determining that the vehicle is in a drift state. Furthermore, the processor 20 may be configured to determine the drift control amount based on the vertical load deviation and control driving of the vehicle based on the drift control amount.

The processor 20 may be configured to determine the drift state of the vehicle based on the driving state information. Furthermore, the processor 20 may be configured to generate a control signal in response to the detection of a drift state. Furthermore, the processor 20 may be configured to determine a vertical load deviation between the internal and external wheels of the vehicle in a drift state, and determine a control amount proportional to the vertical load deviation. Furthermore, the processor 20 may control the driving device based on the control amount.

The processor 20 may be configured to determine the drift state based on the characteristics that the steering angle and the direction of the yaw rate are changed. Furthermore, the processor 20 may be configured to determine the drift state based on the magnitude of the yaw rate, the magnitude of the lateral slip angle, the magnitude of the accelerator pedal signal, and the brake pedal signal.

The memory 30 may store information obtained through the sensor 10 and may store a specific algorithm used by the processor 20 in a drift control process. The memory 30 may be implement with a hard disk drive, a flash memory, an electrically erasable programmable read-only memory (EEPROM), a static RAM (SRAM), a ferro-electric RAM (FRAM), a phase-change RAM (PRAM), a magnetic RAM (MRAM), a dynamic random access memory (DRAM), a synchronous dynamic random access memory (SDRAM), and a double date rate-SDRAM (DDR-SDRAM), or the like.

Figure 2:
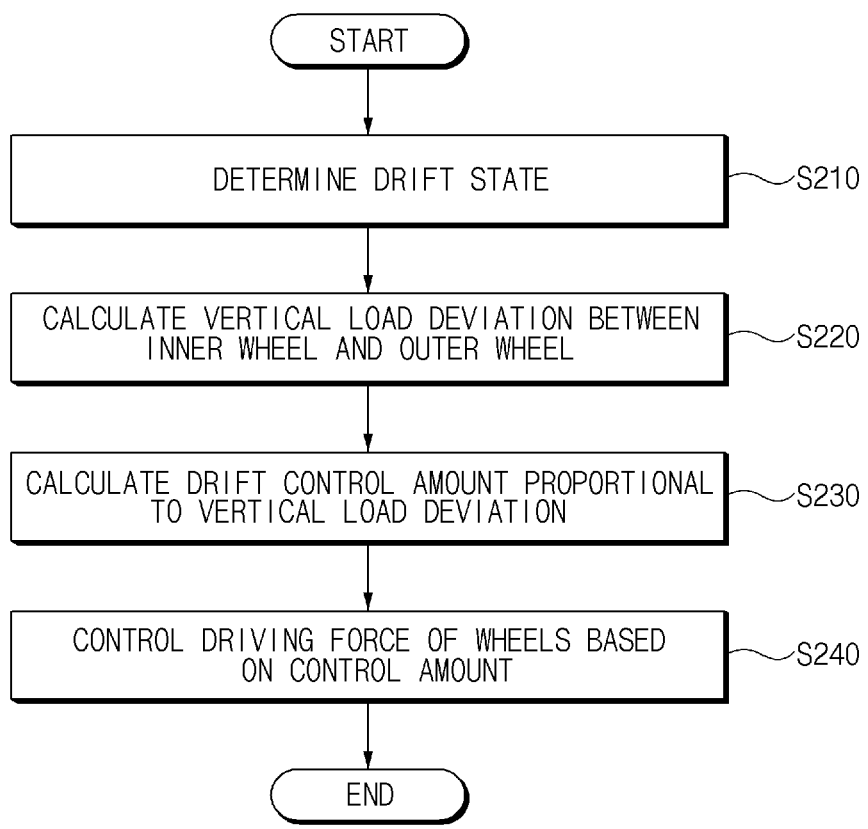
FIG. 2 is a flowchart illustrating a drift control method according to an exemplary embodiment of the present disclosure.

Hereinafter, a method of controlling drift according to an exemplary embodiment of the present disclosure will be described with reference to FIG. 2. FIG. 2 is a flowchart illustrating a drift control method according to an exemplary embodiment of the present disclosure. Hereinafter, the procedures illustrated in FIG. 2 will be described focusing on an exemplary embodiment performed by the drift control apparatus 100 of FIG. 1.

In S210, the processor 20 may be configured to determine a drift state based on driving state information of the vehicle.

Figure 3:
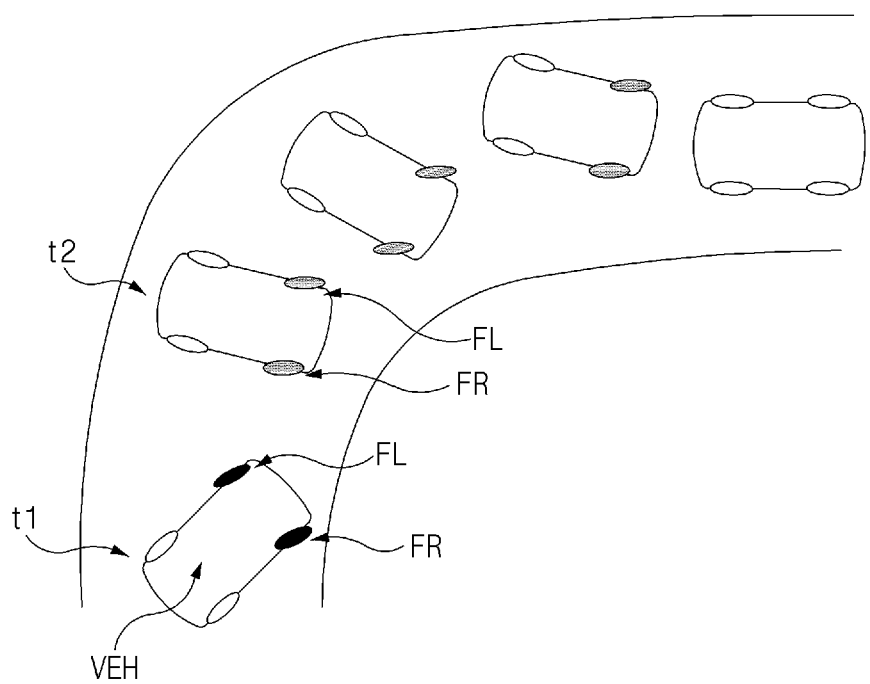
FIG. 3 is a diagram illustrating a drift state.

FIG. 3 is a diagram illustrating a drift state. FIG. 3 illustrates drift based on a rear wheel driving vehicle.

Referring to FIG. 3, the steering wheel of a vehicle VEH is turned to the right at the moment the vehicle VEH enters a corner turning in the right direction, so that front wheels FL and FR may rotate at a specified angle in the right direction, as at a first timing t1, when the front wheels FL and FR rotate and the speed of the vehicle is too high, oversteer may occur in which the rear wheels lose grip on the ground and enter excessively toward the inside of a corner.

Thereafter, as at a second timing t2, when the driver counter-steers in the opposite direction to the direction in which the vehicle is to turn, the vehicle VEH may travel in the opposite direction to the steering angle while being prevented from rapidly turning.

In the present specification, a state in which a driver counter-steers in a state in which an oversteer phenomenon occurs due to a loss of grip force in a rear wheel of a vehicle may be determined as a drift state.

To the present end, the processor 20 may identify the directions of the steering angle and the yaw rate of the vehicle VEH, and when the directions of the steering angle and the yaw rate are opposite, the processor 20 may be determined that the vehicle VEH is in a drift state.

In S220, the processor 20 may be configured to determine the vertical load deviation between the internal and external wheels.

The internal wheel may refer to a wheel located in a turning direction of the vehicle, and the external wheel may refer to a wheel located opposite to the turning direction of the vehicle.

The processor 20 may be configured to determine the vertical load of the internal wheel and the vertical load of the external wheel, respectively, to determine the vertical load deviation between the internal and external wheels. A scheme of determining the vertical load is as follows.

Hereinafter, a scheme of determining a vertical load according to an exemplary embodiment of the present disclosure will be described based on Equation 1 and FIG. 4.

Figure 4:
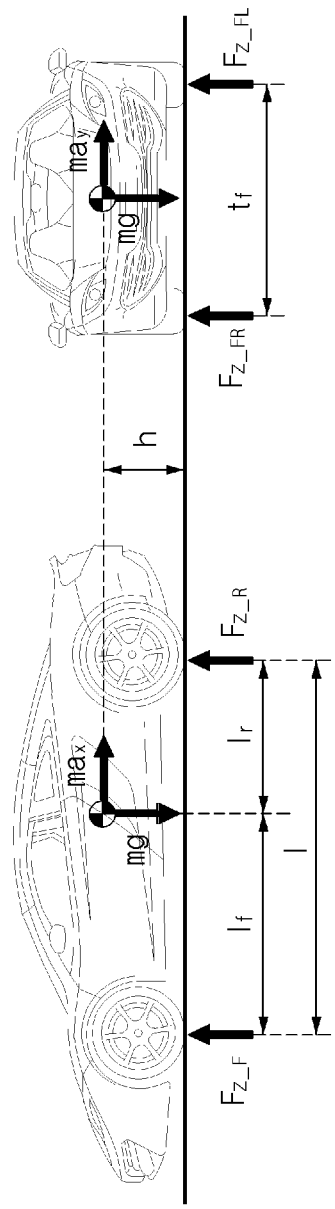
FIG. 4 is a diagram illustrating factors related to a vertical load of a vehicle.

FIG. 4 is a diagram illustrating factors related to a vertical load of a vehicle. A determination formula for obtaining a vertical load of each tire of a vehicle may be expressed as following Equation 1.

$$F_{z\_FL} = \frac{m}{2}\left(\frac{l_r}{l} \times g - \frac{h}{l} \times a_x\right) - m\left(\frac{l_r}{l} \times g - \frac{h}{l} \times a_x\right) \times \left(\frac{h}{t_f \times g}\right) \times a_y$$

$$F_{z\_FR} = \frac{m}{2}\left(\frac{l_r}{l} \times g - \frac{h}{l} \times a_x\right) + m\left(\frac{l_r}{l} \times g - \frac{h}{l} \times a_x\right) \times \left(\frac{h}{t_f \times g}\right) \times a_y$$

$$F_{z\_RL} = \frac{m}{2}\left(\frac{l_f}{l} \times g + \frac{h}{l} \times a_x\right) - m\left(\frac{l_f}{l} \times g + \frac{h}{l} \times a_x\right) \times \left(\frac{h}{t_r \times g}\right) \times a_y$$

$$F_{z\_RR} = \frac{m}{2}\left(\frac{l_f}{l} \times g + \frac{h}{l} \times a_x\right) + m\left(\frac{l_f}{l} \times g + \frac{h}{l} \times a_x\right) \times \left(\frac{h}{t_r \times g}\right) \times a_y$$

[Equation 1]

Each factor shown in Equation 1 and FIG. 4 are as follows.

Mass (m) may refer to the weight of a vehicle. A vehicle wheelbase "l" may refer to a distance between a front wheel axle and a rear wheel axle of a vehicle. The front wheel distance lf may mean a distance from the center of gravity (CG) of the vehicle to the front wheel axle. The rear wheel distance lr may mean a distance from the center of gravity of the vehicle to the rear wheel axle. The vehicle height "h" may mean the height of the vehicle body from the center of gravity of the vehicle. "g" may mean gravitational acceleration. "tf" may mean the distance of the left and right wheels of the front wheel axle. "tr" may mean the distance between the left and right wheels on the rear wheel axle. "ax" may mean longitudinal acceleration of the vehicle. "ay" may mean the lateral acceleration of the vehicle. "FzFL/FzFR/FzRL/FzRR" may mean vertical loads applied to vehicle tires. "FzFL" may mean the vertical load of the left front tire, "FzFR" may mean the vertical load of the right front tire, "FzRL" may mean the vertical load of the left rear tire, and "FzRR" may mean the vertical load of the right rear tire.

The processor 20 may be configured to determine the vertical load of a tire based on Equation 1. In Equation 1, the mass "m", front wheel distance lf, rear wheel distance lr, vehicle height "h", and distances between left and right wheels may be fixed constants. Accordingly, the processor 20 may be configured to determine the vertical load of a tire based on the longitudinal acceleration ax and the lateral acceleration ay of the vehicle.

In S230, the processor 20 may be configured to determine the drift control amount based on the vertical load deviation.

The drift control amount may be set to a size proportional to the vertical load deviation.

According to an exemplary embodiment of the present disclosure, the processor 20 may be configured to determine the drift control amount in proportion to the sizes of the internal and external wheels.

Furthermore, the processor 20 may be configured to determine the drift control amount in proportion to the vehicle speed.

Furthermore, the processor 20 may be configured to determine the drift control amount in proportion to the mass.

As a result, the processor 20 may be configured to determine a drift control amount $T_{Drift\_Ctrl}$ as in Equation 2 below.

$$T_{Drift\_Ctrl} = \{k1 \times (F_{z_{RL}} - F_{z_{RR}})\} \times K2 \times M \times K3 \times v_x\} \qquad \text{[Equation 2]}$$

The K1, K2 and K3 are first parameter, second parameter and third parameter, respectively.

Hereinafter, more detailed technical features of each procedure shown in FIG. 2 are described as follows.

Figure 5:
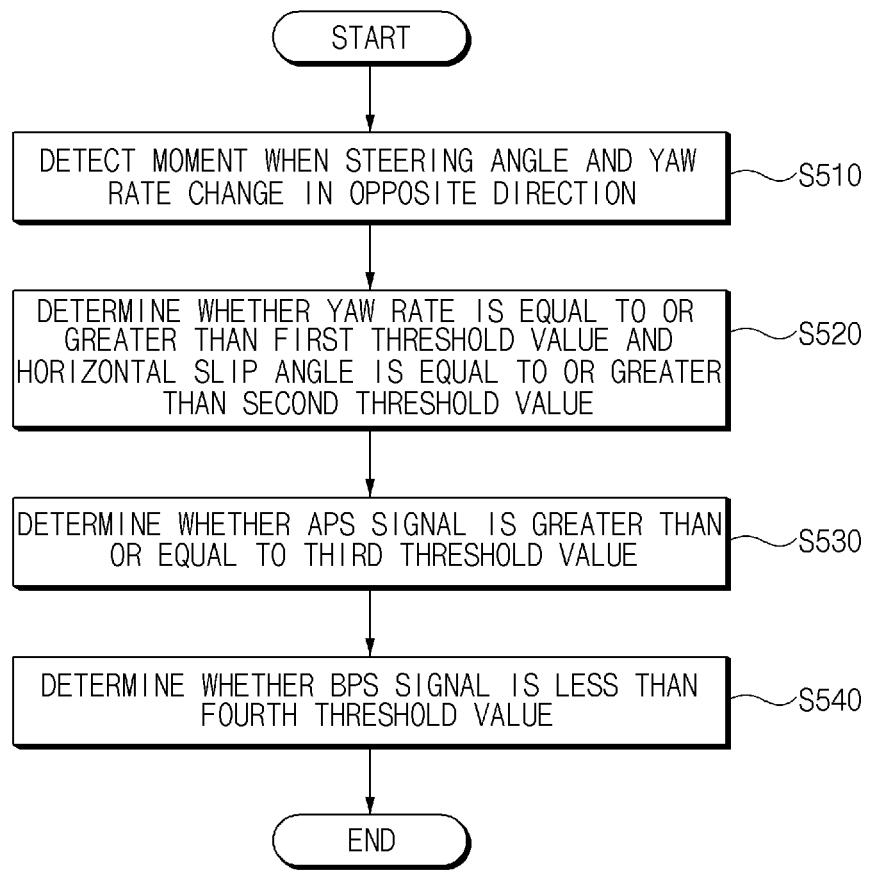
FIG. 5 is a flowchart illustrating identifying a drift state according to another exemplary embodiment of the present disclosure.

FIG. 5 is a flowchart illustrating identifying a drift state according to another exemplary embodiment of the present disclosure.

Hereinafter, a scheme of identifying a drift state according to another exemplary embodiment of the present disclosure is described with reference to FIG. 5.

In S510, the processor 20 may be configured to determine whether the steering angle and the yaw rate are in opposite directions. This will be described below with reference to FIG. 6 and FIG. 7.

Figure 6:
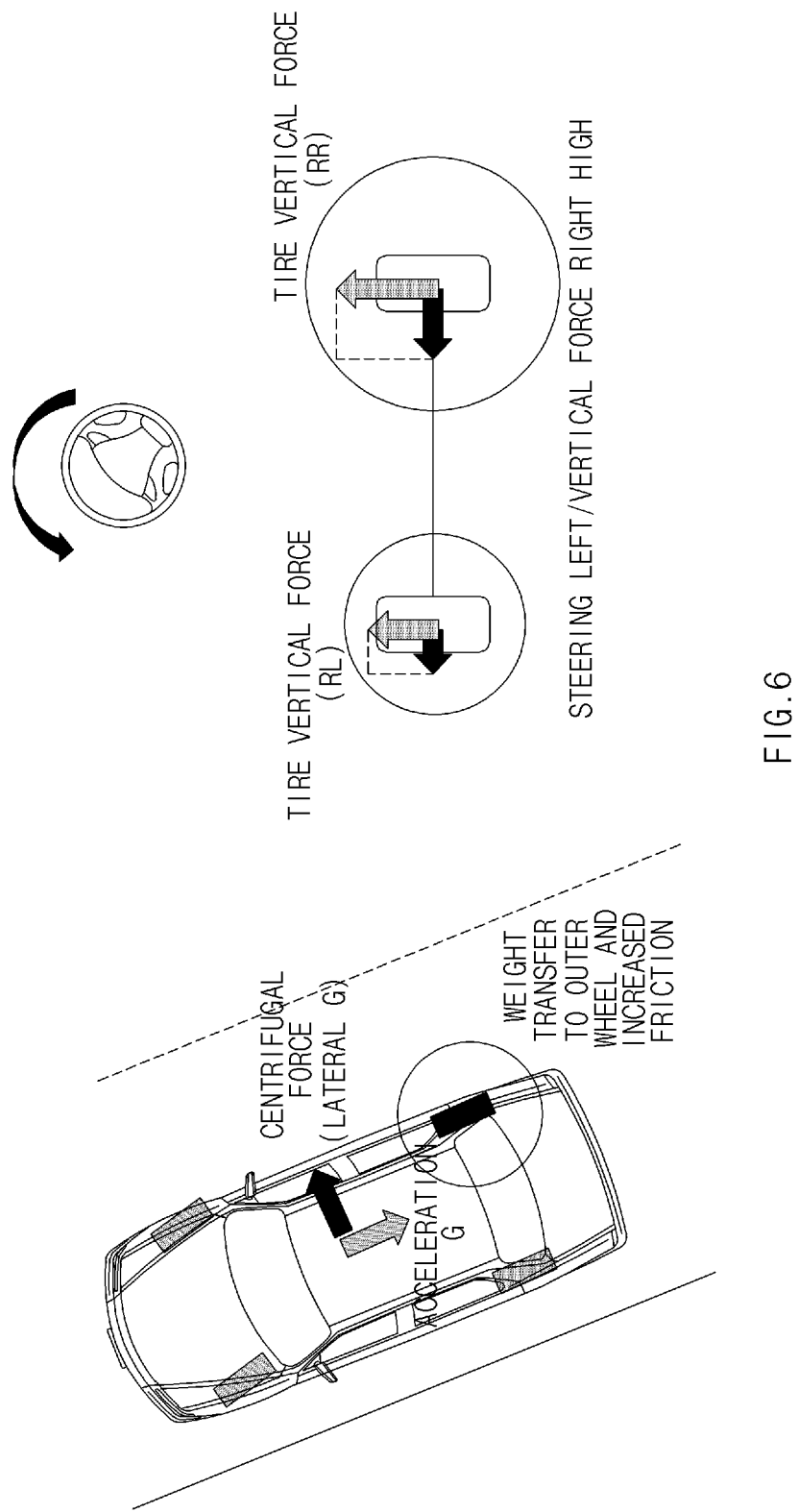
FIG. 6 and FIG. 7 are diagrams illustrating a steering angle and a yaw rate when entering drift.
Figure 7:
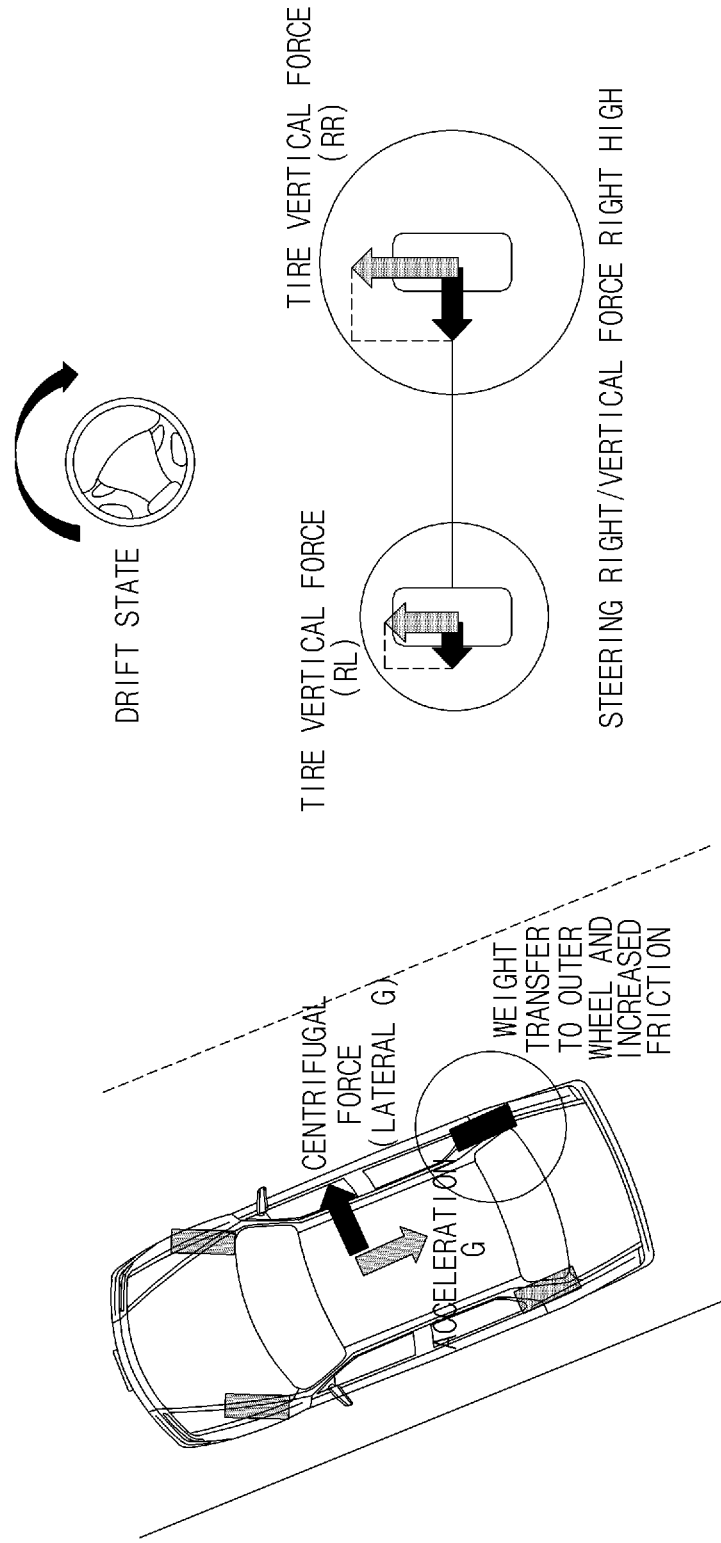

FIG. 6 and FIG. 7 are diagrams illustrating a steering angle and a yaw rate when entering drift.

Before entering a drift state, the directions of a steering angle and a yaw rate may be determined according to the turning direction of a vehicle. For example, as shown in FIG. 6, when the vehicle turns left, the steering angle and the yaw rate may indicate the left direction thereof.

The vertical loads of the tires may act more heavily on the external wheel corresponding to the direction opposite to the turning direction. For example, as shown in FIG. 6, when the vehicle turns left, the vertical load on the right rear wheel may be greater than that on the left rear wheel.

However, as shown in FIG. 7, in the case of a drift state, the steering angle may indicate a direction opposite to a state in which oversteer occurs due to counter steering. Furthermore, due to the slip phenomenon of the vehicle in the drift state, the yaw rate may maintain the same direction as in the oversteer state regardless of the steering angle. That is, as shown in FIG. 7, even when the steering is turned to the right for drift, the yaw rate may indicate the left direction thereof.

Furthermore, the vertical load of a tire in a drift state may appear regardless of a general turning state. For example, as shown in FIG. 7, in a drift state, the vertical load may exert a greater force on the right rear wheel corresponding to the external wheel of the vehicle according to the turning direction, but the right rear wheel corresponds to the same direction as the steering angle, which is in the right direction thereof. That is, in a normal driving state, a larger vertical load corresponding to the external wheel in the direction opposite to the steering angle is applied, but in a drift state, a larger vertical load may be applied to the tire in the direction of the steering angle.

According to an exemplary embodiment of the present disclosure, it is possible to compensate for the deviation of the vertical load in the drift state, which is different from that of the general driving state, through the procedures described below.

In S520, the processor 20 may be configured to determine whether the yaw rate is greater than or equal to the first threshold value and the lateral slip angle is greater than or equal to the second threshold value.

Because the drift state is premised on oversteer, the yaw rate may exhibit a high value compared to a general turning motion. Accordingly, the processor 20 may be configured to determine the drift state based on the premise that the yaw rate obtained from the yaw rate sensor 14 is equal to or greater than the first threshold value.

Similarly, when entering drift, the lateral slip angle may exhibit a relatively large value. Accordingly, the processor 20 may be configured to determine the lateral slip angle and determine the drift state based on whether the lateral slip angle is greater than or equal to the second threshold value.

The processor 20 may be configured to determine the lateral slip angle ((3) based on the following Equation 3.

$$\beta = \int \left( \frac{A_y}{V_x} - \gamma \right) dt \qquad [\text{Equation 3}]$$

In Equation 3, $A_y$ may refer to a lateral acceleration, $v_x$ may refer to a vehicle speed, and y may refer to a yaw rate. That is, the processor 20 may be configured to determine the lateral slip angle ((3) by integrating the deviation between the yaw rate and the lateral acceleration relative to the vehicle speed.

In S530, the processor 20 may be configured to determine whether the APS signal is greater than or equal to the third threshold value.

The drift state may include a driver's intentional driving operation in an oversteering state, and one of the driver's intentional driving operations may be an action of operating an accelerator pedal. Accordingly, the processor 20 may be configured to determine the force applied to the accelerator pedal and use a condition in which the APS signal is greater than or equal to the preset third threshold value as a condition for determining the drift state.

In S540, the processor 20 may be configured to determine whether the BPS signal is greater than or equal to a fourth threshold value.

The drift state may include a driver's intentional driving operation, and the driver may include an intention to continue driving using an oversteering state. Accordingly, the driver may not operate the brake pedal for the drift state. The processor 20 may be configured to determine the force applied to the brake pedal and use a condition in which the BPS signal is greater than or equal to a preset fourth threshold value as a condition for determining the drift state.

The processor 20 may be configured to determine that the drift state is not present when any one condition is not satisfied among procedures S510, S520, S530 and S540.

Alternatively, the processor 20 may be configured to determine the drift state by use of a condition including at least one of the procedures S520 to S540.

Alternatively, to simplify the algorithm for determining the drift state, the drift state may be determined using only procedure S410.

Figure 8:
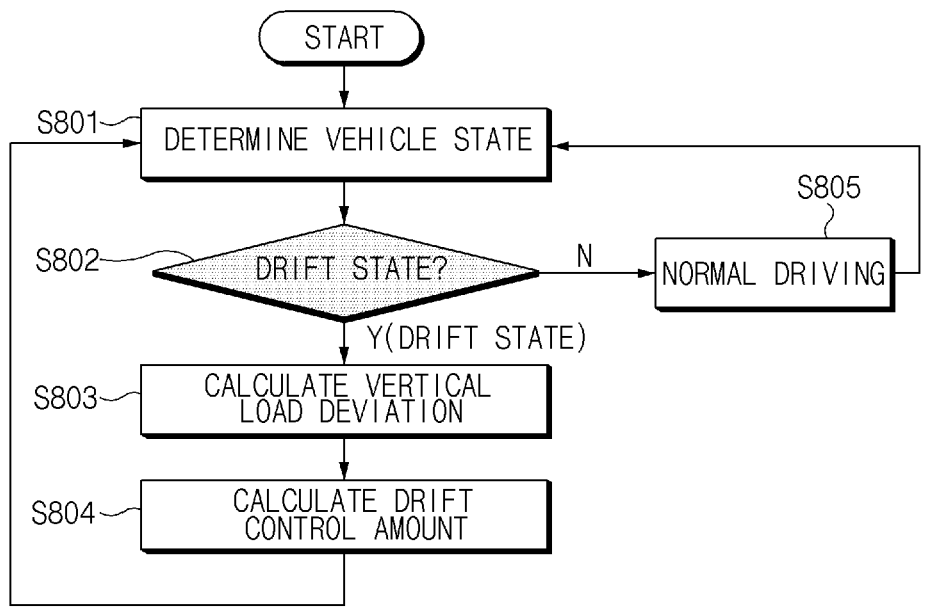
FIG. 8 is a flowchart illustrating a method of controlling drift according to another exemplary embodiment of the present disclosure.

FIG. 8 is a flowchart illustrating a method of controlling drift according to another exemplary embodiment of the present disclosure.

Hereinafter, a method of controlling drift according to another exemplary embodiment of the present disclosure will be described with reference to FIG. 8.

In S801, the processor 20 may be configured to determine a vehicle state. The processor 20 may be configured to determine the vehicle state based on vehicle state information obtained through the sensor 10.

To the present end, the processor 20 may receive the vehicle state information, such as a steering angle, an APS signal, a BPS signal, a yaw rate, a lateral acceleration, a longitudinal acceleration, and a wheel speed, from the sensor 10.

In S802, the processor 20 may be configured to determine whether the vehicle is in a drift state based on vehicle state information.

The processor 20 may be configured to determine the drift state based on the steering angle and the yaw rate, as in S210 of FIG. 2.

Alternatively, as in FIG. 4, the processor 20 may be configured to determine the drift state based on at least one condition among the magnitude of the yaw rate, the magnitude of the APS signal, and the magnitude of the BPS signal, in addition to the steering angle and the yaw rate.

In S803, the processor 20 may be configured to determine the vertical load deviation.

According to an exemplary embodiment of the present disclosure, the processor 20 may be configured to determine a vertical load deviation between the internal wheel and the external wheel of the vehicle. The processor 20 may be configured to determine the vertical load deviation between the front wheels or the vertical load deviation between the rear wheels in consideration of weather and road surface conditions.

Alternatively, according to an exemplary embodiment of the present disclosure, the processor 20 may be configured to determine the vertical load deviation of the driving wheel. The processor 20 may be configured to determine the vertical load deviation of the driving wheel that provide a driving force to the driving device 50 to control the driving force of the driving device 50 by use of the drift control amount $T_{Drift\_Ctrl}$. That is, in the case of rear wheel drive, the processor 20 may be configured to determine a deviation between the vertical load of the left tire of the rear wheel and the vertical load of the right tire of the rear wheel.

In S804, the processor 20 may be configured to determine the drift control amount $T_{Drift\_Ctrl}$.

The processor 20 may be configured to determine the drift control amount $T_{Drift\_Ctrl}$ based on Equation 2 described above.

Procedure S804 may include a procedure in which the processor 20 drives the vehicle based on the drift control amount $T_{Drift\_Ctrl}$.

That is, the processor 20 may apply a driving force proportional to the drift control amount $T_{Drift\_Ctrl}$ to the external wheel. For example, the processor 20 may increase the wheel speed in proportion to the drift control amount $T_{Drift\_Ctrl}$ of an external wheel among driving wheels. To the present end, the processor 20 may increase the torque of the driving device 50 that drives the external wheel.

After controlling the driving force of the vehicle based on the drift control amount $T_{Drift\_Ctrl}$, the processor 20 may be configured to determine the vehicle state again as in procedure S801.

In S805, the processor 20 may perform normal driving.

According to an exemplary embodiment of the present disclosure, normal driving may mean encompassing driving schemes other than a procedure for performing drift control based on a deviation of a vertical load in a drift state.

For example, the normal driving according to an exemplary embodiment of the present disclosure may be classified according to a state in which the vehicle travels straight or a state in which the vehicle turns.

When the vehicle is in a straight ahead state, the processor 20 may be configured to determine wheel slip of the left and right driving wheels and control driving of the vehicle to reduce the difference in speed between the left and right wheels.

When the vehicle is in a turning state, the processor 20 may perform feedforward control, feedback control, APS/BPS control, and turning wheel slip control.

The feedforward control may include yaw responsiveness control and yaw damping control.

The feedback control may include target yaw rate determination and yaw rate error-based control.

The APS/BPS control may include control performed based on an accelerator pedal gain map and a brake gain map.

The turning wheel slip control may refer to a scheme of determining wheel slip of driving wheels during turning and controlling the driving device to reduce the wheel slip.

Figure 9:
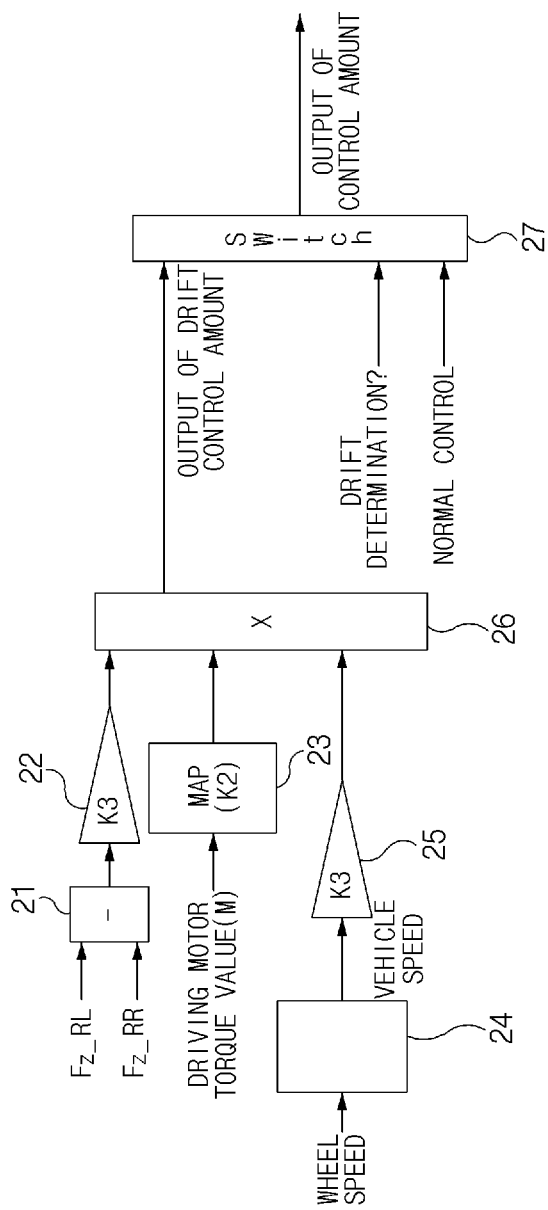
FIG. 9 is a diagram illustrating a control block according to an exemplary embodiment of the present disclosure.

FIG. 9 is a diagram illustrating a control block according to an exemplary embodiment of the present disclosure. In FIG. 9, a first operator 21, a second operator 22, a fourth operator 24, a fifth operator 25, and a sixth operator 26 may be components included in the processor 20 shown in FIG. 1. According to an exemplary embodiment of the present disclosure, a third operator 23 may also be a component included in the processor 20.

Referring to FIG. 9, the first operator 21 may be configured to determine a deviation between a vertical load Fz_RL of the left rear wheel and a vertical load of the right rear wheel Fz_RR.

The second operator 22 may multiply the vertical load deviation by a first parameter K1. The first parameter K1 may be a preset parameter.

The third operator 23 may multiply the second constant by a torque value M of the driving device 50, for example, a driving motor. A second parameter K2 may be a preset parameter.

The fourth operator 24 may obtain the vehicle speed based on the wheel speed.

The fifth operator 25 may multiply the vehicle speed by a third parameter K3.

The sixth operator 26 multiplies all the data provided from the second operator 22, the third operator 23 and the fifth operator 25 to determine the drift control amount as in Equation 2. Furthermore, the sixth operator 26 may provide the drift control amount to a switch 27.

The switch 27 may output a control amount or perform normal control according to a result of determining the drift state of the processor 20.

Figure 10:
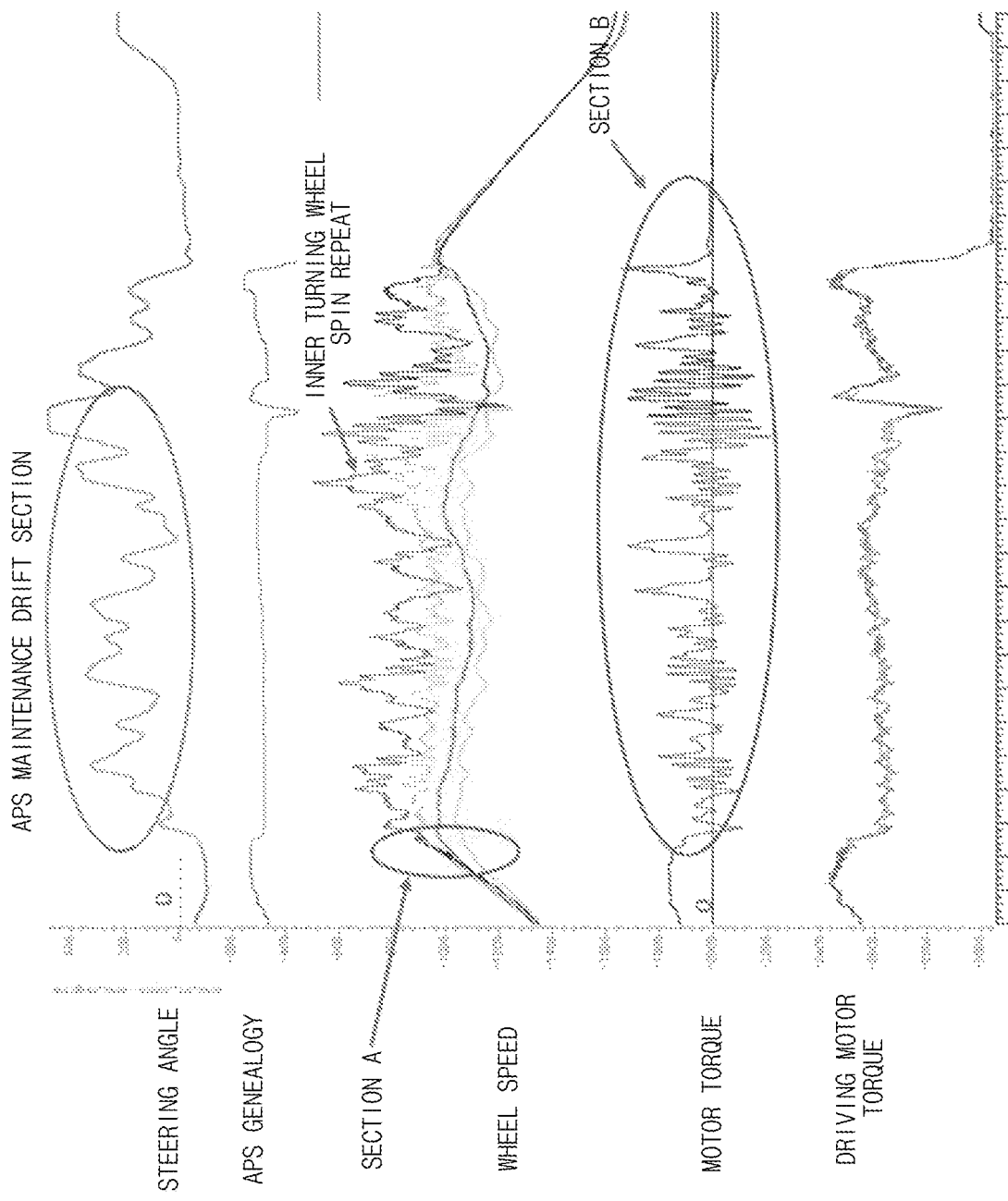
FIG. 10, and FIG. 11 are diagrams illustrating an effect of driving force control using a drift control amount.
Figure 11:
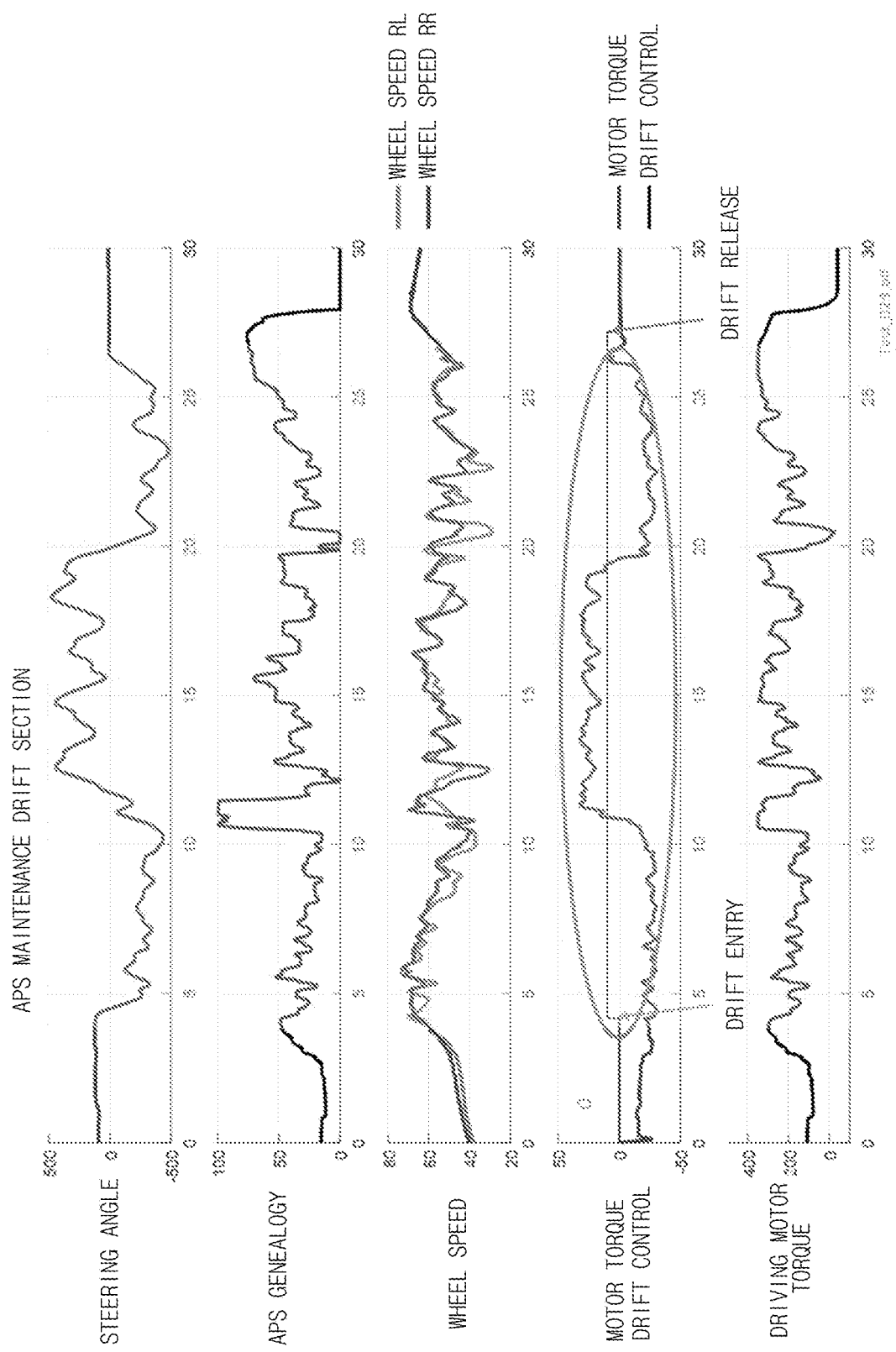

With reference to FIG. 10, and FIG. 11, the effect of the driving force control using the drift control amount according to the exemplary embodiment of the present disclosure will be described below.

FIG. 10 is a diagram illustrating an actual measurement result of driving force control according to a comparative example. FIG. 11 is a diagram illustrating an actual measurement result of driving force control according to drift control according to an exemplary embodiment of the present disclosure. The driving force control scheme according to the comparative example shown in FIG. 10 illustrates a normal driving scheme improving a wheel speed difference between wheels based on a wheel speed.

Referring to FIG. 10, according to a comparison example, in section A, which is a drift entry time, the difference in wheel speed difference between wheels may not be large. However, in a drift period, it may be understood that the steering angle variation frequency increases to correct the wheel behavior of the inside during turning. Accordingly, a wheel speed deviation between the internal and external wheels may occur during the drift period, and a chattering phenomenon may occur, which a torque variation of the drive motor is frequently caused to correct the wheel speed deviation. Due to the phenomenon in which the amount of torque change of the drive motor changes very rapidly, the driver may feel unnatural driving operation in a drift state, and may feel a sense of difference in driving operation at the moment the drift control is released.

To the contrary, referring to FIG. 11, because a method of controlling drift according to an exemplary embodiment of the present disclosure does not directly consider the change in wheel speed, it is possible to prevent chattering phenomenon of the change amount of driving motor torque from occurring.

Furthermore, according to an exemplary embodiment of the present disclosure, because the drift control is performed based on the vertical load difference, the driving force may be smoothly provided in the direction in which the vehicle turns regardless of the steering angle. That is, more smooth drift control may be performed by additionally providing driving force to the external wheel of the vehicle.

Figure 12:
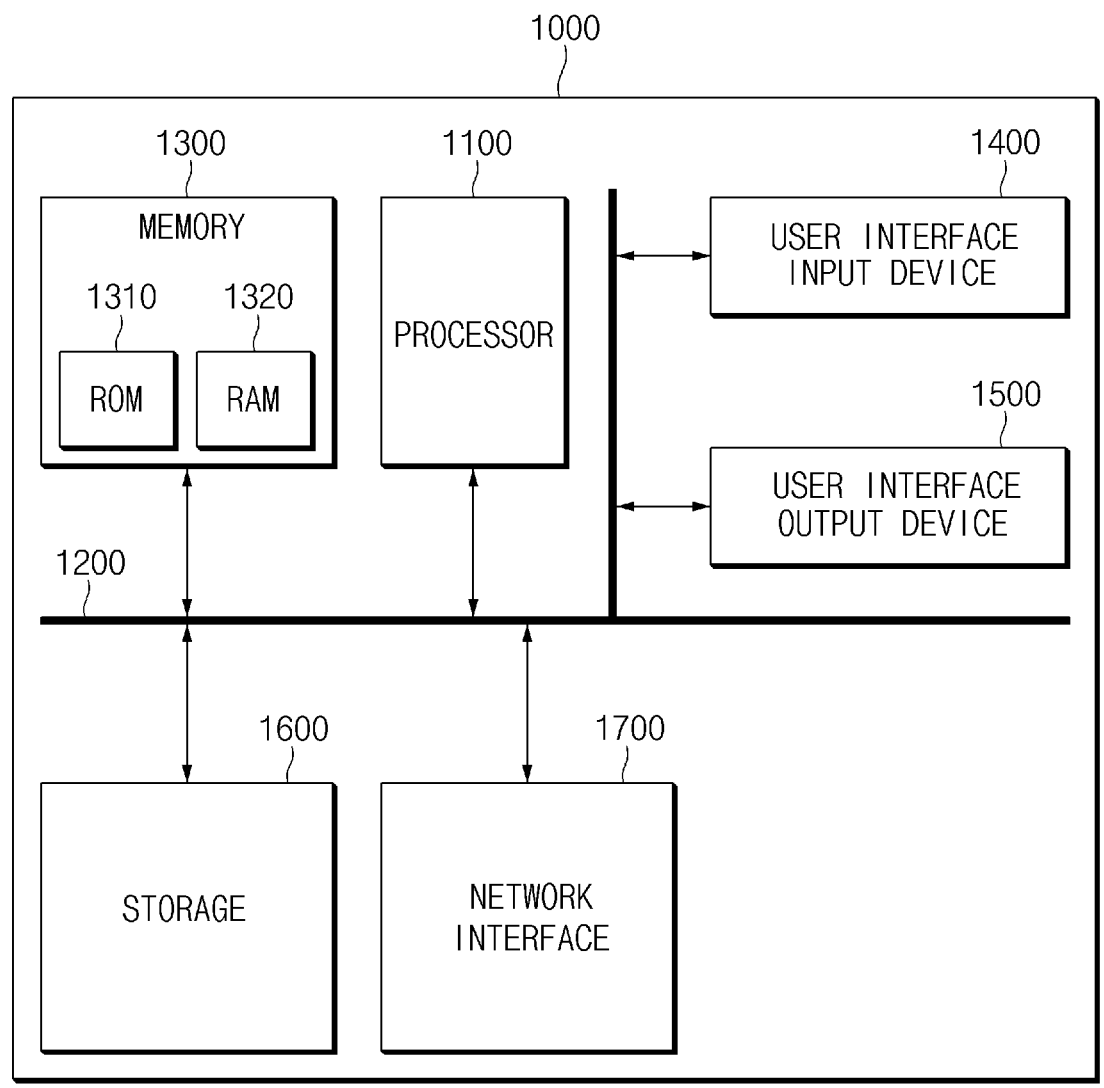
FIG. 12 is a block diagram illustrating a computing system according to an exemplary embodiment of the present disclosure.

FIG. 12 is a block diagram illustrating a computing system according to an exemplary embodiment of the present disclosure.

Referring to FIG. 12, a computing system 1000 may include at least one processor 1100, a memory 1300, a user interface input device 1400, a user interface output device 1500, storage 1600, and a network interface 1700 connected through a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a Read-Only Memory (ROM) and a Random Access Memory (RAM).

Accordingly, the processes of the method or algorithm described in relation to the exemplary embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM.

The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to an exemplary embodiment of the present disclosure, because the difference in vertical load between a drift state and a normal state may be compensated for, it is possible to more easily perform driving operation in a drift state by distributing the driving force in consideration of the actual driving of the vehicle rather than the steering angle.

Furthermore, according to an exemplary embodiment of the present disclosure, because a change in wheel speed is not directly taken into account, it is possible to prevent a chattering phenomenon of a change in driving motor torque from occurring.

Furthermore, according to an exemplary embodiment of the present disclosure, by reducing the sense of difference in driving motor torque change between a drift state and a normal driving state, the sense of difference in driving operation at the moment when the drift state is released may be improved.

Furthermore, various effects that are directly or indirectly understood through the present disclosure may be provided.

Although exemplary embodiments of the present disclosure have been described for illustrative purposes, those skilled in the art will appreciate that various modifications, additions and substitutions are possible, without departing from the scope and spirit of the present disclosure.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A drift control apparatus comprising:
a sensor configured to obtain driving state information of a vehicle;
a processor electrically connected to the sensor and configured to:
determine a drift state of the vehicle according to the driving state information,
generate a control signal corresponding to detecting the drift state,
determine a vertical load deviation between an internal wheel and an external wheel of the vehicle in the drift state, and
determine a control amount in proportion to the vertical load deviation; and
a driving device electrically connected to the processor and configured to control driving forces of wheels in the vehicle based on the determined control amount in response to the control signal,
wherein the processor is configured to generate the control signal when an accelerator pedal signal is equal to or greater than a third threshold value and a brake pedal signal is equal to or less than a fourth threshold value.

2. The drift control apparatus of claim 1, wherein the processor is configured to generate the control signal at a timing that satisfies a first condition in which directions of a steering angle and a yaw rate of the vehicle are opposite to each other from a same state.

3. The drift control apparatus of claim 2, wherein the processor is configured to generate the control signal when the yaw rate is equal to or greater than a first threshold value and a lateral slip angle is equal to or greater than a second threshold value.

4. The drift control apparatus of claim 2, wherein the processor is configured to stop an output of the control signal when the processor concludes that at least one of the first condition, a second condition, and a third condition is not satisfied.

5. The drift control apparatus of claim 1, wherein the processor is configured to determine a vertical load of each of at least one pair of the internal and external wheels in the vehicle based on a longitudinal acceleration and a lateral acceleration.

6. The drift control apparatus of claim 5, wherein the processor is configured to determine a vertical load deviation between an internal wheel of a driving wheel and an external wheel of the driving wheel.

7. The drift control apparatus of claim 1, wherein the processor is configured to determine the control amount to be larger in proportion to a mass and a speed of the vehicle.

8. The drift control apparatus of claim 1, wherein the processor is configured to transmit a driving force proportional to the control amount to external wheels in a turning direction of the vehicle in the drift state.

9. The drift control apparatus of claim 1, wherein the processor is configured to control the driving forces of the wheels to reduce a wheel speed difference between the internal wheel and the external wheel in a non-drift state.

10. A method of controlling drift, the method comprising:
determining, by a processor, a drift state of a vehicle based on driving state information of the vehicle and generating a control signal corresponding to detecting the drift state;
determining, by the processor, a vertical load deviation between an internal wheel and an external wheel of the vehicle in response to the control signal;
determining, by the processor, a control amount in proportion to the vertical load deviation; and
controlling, by the processor, driving forces of wheels in the vehicle based on the determined control amount, and
wherein the generating of the control signal includes:

determining whether an accelerator pedal signal is equal to or greater than a third threshold value and a brake pedal signal is equal to or less than a fourth threshold value.

11. The method of claim 10, wherein the generating of the control signal further includes:
   generating the control signal at a timing that satisfies a first condition in which directions of a steering angle and a yaw rate of the vehicle are opposite to each other from a same state.

12. The method of claim 11, wherein the generating of the control signal further includes:
   determining whether the yaw rate is equal to or greater than a first threshold value and a lateral slip angle is equal to or greater than a second threshold value.

13. The method of claim 11, wherein the generating of the control signal further includes:
   stopping an output of the control signal when the processor concludes that at least one of the first condition, a second condition, and a third condition is not satisfied.

14. The method of claim 10, wherein the determining of the vertical load deviation includes:
   determining a vertical load of each of at least one pair of the internal and external wheels in the vehicle based on a longitudinal acceleration and a lateral acceleration.

15. The method of claim 14, wherein the determining of the vertical load deviation includes:
   determining a vertical load deviation between an internal wheel of a driving wheel and an external wheel of the driving wheel.

16. The method of claim 10, wherein the determining of the control amount includes:
   determining the control amount to be larger in proportion to a mass and a speed of the vehicle.

17. The method of claim 10, wherein the controlling of the driving forces includes:
   transmitting a driving force proportional to the control amount to external wheels in the vehicle in a turning direction of the vehicle in the drift state.

18. The method of claim 10, wherein the controlling of the driving forces includes:
   controlling the driving forces of the wheels to reduce a wheel speed difference between the internal wheel and the external wheel in a non-drift state.

* * * * *